United States Patent
Shi et al.

(10) Patent No.: US 11,613,616 B2
(45) Date of Patent: Mar. 28, 2023

(54) PREPARATION METHOD OF GREEN, BIODEGRADABLE, AND MULTIFUNCTIONAL COLLAGEN-BASED NANOCOMPOSITE FILM

(71) Applicant: Shaanxi University of Science & Technology, Shaanxi (CN)

(72) Inventors: Jiabo Shi, Shaanxi (CN); Ruizhen Zhang, Shaanxi (CN); Siqi Lv, Shaanxi (CN); Yu Cui, Shaanxi (CN); Wenying Cao, Shaanxi (CN); Jianzhong Ma, Shaanxi (CN)

(73) Assignee: Shaanxi University of Science & Technology, Xi'an (CN)

( * ) Notice: Subject to any disclaimer, the term of this patent is extended or adjusted under 35 U.S.C. 154(b) by 22 days.

(21) Appl. No.: 17/348,133

(22) Filed: Jun. 15, 2021

(65) Prior Publication Data
US 2021/0309817 A1   Oct. 7, 2021

(51) Int. Cl.
*C08K 3/34* (2006.01)
*C08K 5/107* (2006.01)
*C08J 5/18* (2006.01)
*C08K 5/134* (2006.01)
*C08K 5/3462* (2006.01)

(52) U.S. Cl.
CPC .............. *C08J 5/18* (2013.01); *C08K 5/1345* (2013.01); *C08K 5/3462* (2013.01); *C08J 2389/06* (2013.01); *C08K 2201/011* (2013.01)

(58) Field of Classification Search
CPC .... C08K 2201/011; C08K 3/34; C08K 3/346; C08J 2389/00
See application file for complete search history.

(56) References Cited

U.S. PATENT DOCUMENTS

| 2012/0309245 A1* | 12/2012 | Liao | ........................ | C08K 3/346 |
| | | | | 521/84.1 |
| 2014/0187413 A1 | 7/2014 | Lagaron Cabello | | |

FOREIGN PATENT DOCUMENTS

| BR | 102013021718 A2 | * | 2/2018 | | |
| CN | 102250368 A | * | 11/2011 | | |
| CN | 102250368 A | | 11/2011 | | |
| CN | 104109254 A | | 10/2014 | | |
| CN | 105907063 A | | 8/2016 | | |
| CN | 107177044 A | | 9/2017 | | |
| CN | 108892793 A | * | 11/2018 | ................ | C08J 5/18 |
| CN | 108892793 A | | 11/2018 | | |
| CN | 110169979 A | * | 8/2019 | | |
| CN | 110169979 A | | 8/2019 | | |
| CN | 110511409 A | | 11/2019 | | |
| CN | 110527756 A | * | 12/2019 | ............. | C14C 11/00 |
| CN | 110527756 A | | 12/2019 | | |
| JP | 2008110926 A | | 5/2008 | | |

OTHER PUBLICATIONS

Machine translation into English; CN 108892793 A; Jiang et al. (Year: 2018).*
Machine translation into English; CN 102250368 A; Changdou et al. (Year: 2011).*
Machine translation into English; CN 110169979 A; Dan et al. (Year: 2019).*
Machine translation into English; CN 110527756 A; Jiabo et al. (Year: 2019).*
Machine translation into English; BR 102013021718 A2 (Year: 2018).*
Ting Zou et al., Research progress of tannin in polymer materials; Applied Chemical Industry, vol. 44, Issue 12, Dec. 2015, pp. 2308-2311; College of Chemistry and Chemical Engineering, Jishou University, Jishou 416000, China.

* cited by examiner

*Primary Examiner* — Karuna P Reddy

(57) ABSTRACT

Disclosed a preparation method of a green, biodegradable, and multifunctional collagen-based nanocomposite film, and overcomes the problems of difficult biodegradation, poor barrier property, and single function of food packaging materials in the existing technologies. The present invention includes the following steps: adding silicate nanosheet into deionized water for ultrasonic dispersion; then adding polyphenolic acid into the mixture, wherein a mass ratio of the polyphenolic acid to the silicate nanosheet is 1:(0.2~1); and adjusting the pH value to 3.0~4.0 to obtain a solution A; adding collagen with a concentration of 5 g/L into an acetic acid solution, and fully dissolving the collagen to obtain a solution B; isovolumetrically mixing the solution A with the solution B, stirring at room temperature, and adjusting the pH value to 4.5~5.5 to obtain a casting solution; and pouring the casting solution into a polytetrafluoroethylene mold, and naturally drying to obtain a nanocomposite film.

1 Claim, 3 Drawing Sheets

PREPARATION METHOD OF GREEN, BIODEGRADABLE, AND MULTIFUNCTIONAL COLLAGEN-BASED NANOCOMPOSITE FILM

CROSS-REFERENCE TO RELATED APPLICATIONS

This application claims the benefit of priority from Chinese Patent Application No. 202010545413.3, filed on Jun. 16, 2020. The content of the aforementioned application, including any intervening amendments thereto, is incorporated herein by reference.

TECHNICAL FIELD

The present invention relates to a preparation method of a biodegradable packaging film material, in particular to a preparation method of a green, biodegradable, and multifunctional collagen-based nanocomposite film.

BACKGROUND OF THE PRESENT INVENTION

Food, as a necessity for human survival, is susceptible to the external environment to be putrefactive, thereby causing huge waste of resources because of the inedibility. Usually, the food is packaged with special materials to isolate oxygen, moisture, and bacteria, in order to achieve a purpose of delaying food putrefaction. Currently, the common food packaging materials on the market are mainly made of polyethylene, polypropylene, polyethylene terephthalate (PET), and other synthetic polymers. Although the synthetic polymers are extremely convenient and effective for food preservation and storage, and can extend the shelf life of food, they still have the disadvantages of refractory biodegradation, poor barrier property, and single function. Therefore, the development of safe, non-toxic, biodegradable, and multifunctional film materials has emerged as a feasible strategy to solve these problems.

Natural polymers, such as proteins (soy protein, whey protein, and collagen), polysaccharides (chitosan, pectin, and starch), as well as lipids, not only possess excellent film-forming property, but also can be used as raw materials to prepare safe, non-toxic, and biodegradable films. Thereinto, the collagen is one of abundant sources, which is biodegradable, safe, and non-toxic. It has a natural triple-helical structure and a compact fiber structure, making it exhibit strong toughness and strength. Therefore, the collagen is suitable for preparing film materials, and widely used in the preparation and application of edible films. However, pristine collagen films show poor mechanical properties, barrier properties, and oil oxidation resistance. In addition, it can be used as a nutrient source for microorganisms, so that it is susceptible to changes of the external environment and has poor resistance to enzymatic degradation, which directly limits its practical application in the packaging film materials.

In recent years, the use of nanomaterials to prepare the packaging film materials has been considered as a promising technology, which can not only significantly enhance the physical properties of the film-forming materials, but also can endow the resulting film materials with improved antibacterial property, oxidation resistance, and other related functional properties. Clay minerals, such as montmorillonite, kaolin, and Laponite are kind of nano-silicates with wide source, low prices, safety, and nontoxicity. Owing to the presence of a lot of active silicon hydroxyl groups and permanent charges on the surfaces of clay particles showing significant interfacial reactivity with the matrices, the clay minerals can be used as excellent modifier, toughener, and reinforcer to improve the thermal stability and mechanical strength of the resulting materials, and confer the resulting materials with multifunctional nano-properties, such as gas barrier property, antibacterial property, and flame retardancy.

At present, some patents have disclosed biopolymer-based composite film materials. For example, patent CN108892793 has disclosed a preparation method of a green, biodegradable, high-barrier, and high-transparency nanocellulose composite film, which is mainly prepared by compounding nano-cellulose, nano-clay, and polyvinyl alcohol; the as-prepared nanocomposite film shows excellent oxygen and vapor barrier properties, mechanical properties, and biodegradability, and has a transmittance of up to 89%. Patent CN110169979 has disclosed a preparation method of sodium alginate/collagen/graphite phase carbon nitride nanosheet photocatalytic antibacterial film; the as-prepared nanocomposite film has excellent photocatalytic self-bacteriostatic performance and rapid hemostasis performance. Patent CN105907063A has disclosed a bacteriostatic bio-nanopackaging film and a preparation method thereof; the film is mainly prepared by compounding gelatin, nano-cellulose, and nano-kaolin; and the resulting composite film material has excellent antibacterial property, mechanical properties, and barrier property. However, specific literature and patent reports about the use of collagen compounded and modified with polyphenolic acid and silicate nanosheet to prepare functional collagen-based nanocomposite films are unavailable at present.

SUMMARY OF THE PRESENT INVENTION

A purpose of the present invention is to provide a preparation method of a green, biodegradable, and multifunctional collagen-based nanocomposite film in order to overcome the problems of difficult biodegradation, poor barrier property, and single function of food packaging materials in the existing technologies. The preparation method provided by the present invention is simple and easy to operate; the raw materials are wide in source with safe, non-toxic, and biodegradable properties; and the resulting composite film has high transmittance and significant antioxidant and antibacterial properties.

To achieve the above purposes, the following technical solution is adopted by the present invention:

A preparation method of a green, biodegradable, and multifunctional collagen-based nanocomposite film includes the following steps:

(1) adding silicate nanosheet into deionized water for ultrasonic dispersion, then adding polyphenolic acid into the mixture, wherein a mass ratio of the polyphenolic acid to the silicate nanosheet is 1:(0.2~1), and adjusting the pH value to 3.0~4.0 to obtain a solution A;

(2) adding collagen with a concentration of 5 g/L into an acetic acid solution, and fully dissolving the collagen to obtain a solution B;

(3) isovolumetrically mixing the solution A with the solution B, stirring at room temperature, and adjusting the pH value to 4.5~5.5 to obtain the casting solution;

(4) pouring the casting solution into a polytetrafluoroethylene mold, and naturally drying to obtain a nanocomposite film.

The silicate nanosheet is any one of Laponite, montmorillonite, and kaolin.

The polyphenolic acid is any one of tannic acid, folic acid, and gallic acid.

Compared with the existing technologies, the present invention has the following advantages and effects:

1. The raw materials used in the present invention are safe, non-toxic, wide in source, and biodegradable;
2. No pollution source is introduced in the process of preparing the composite film in the present invention, and the preparation method is simple and easy to operate;
3. The composite film obtained in the present invention has a transmittance of more than 90% and exhibits significant antioxidant and antibacterial properties.

DETAILED DESCRIPTION OF THE PRESENT INVENTION

Figure 1:
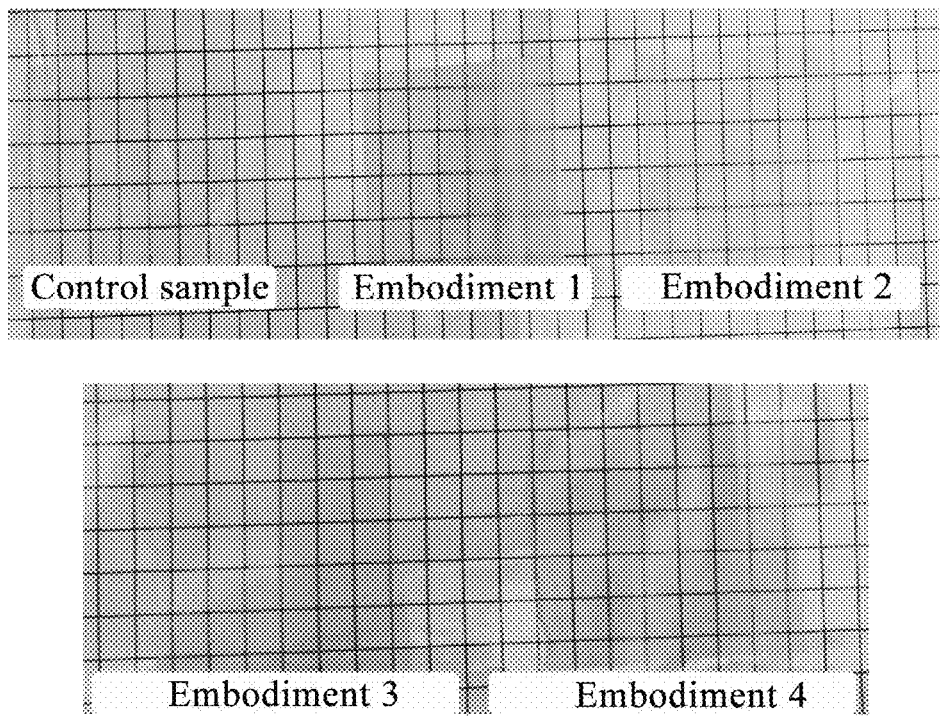
FIG. 1 is a diagram of a collagen-based composite film, wherein a control sample is a pure collagen film.

The present invention will be described in detail below in combination with specific embodiments. The embodiments are used for illustrating the present invention, rather than limiting the scope of the present invention. Implementation conditions used in the embodiments can be further adjusted according to specific experimental environments; and the unspecified implementation conditions usually refer to conditions in the routine experiments.

The present invention relates to a preparation method of a green, biodegradable, and multifunctional collagen-based nanocomposite film, which includes the following steps:

(1) adding silicate nanosheet into deionized water for ultrasonic dispersion; then adding polyphenolic acid into the mixture, wherein a mass ratio of the polyphenolic acid to the silicate nanosheet is 1:(0.2~1); and adjusting the pH value to 3.0~4.0 to obtain a solution A, wherein the silicate nanosheet are any one of Laponite, montmorillonite, and kaolin; and the polyphenolic acid is any one of tannic acid, folic acid, and gallic acid;

(2) adding collagen with a concentration of 5 g/L into an acetic acid solution, and fully dissolving the collagen to obtain a solution B;

(3) isovolumetrically mixing the solution A with the solution B, stirring at room temperature, and adjusting the pH value to 4.5~5.5 to obtain a casting solution;

(4) pouring the casting solution into a polytetrafluoroethylene mold, and naturally drying to obtain a nanocomposite film.

Embodiment 1

(1) adding Laponite nanosheet into deionized water for ultrasonic dispersion; then adding tannic acid into the mixture so that the concentration becomes 1 g/L; and adjusting the pH value to 3.5 to obtain a solution A, wherein a mass ratio of the tannic acid to the Laponite nanosheet is 1:0.2;

(2) adding collagen with a concentration of 10 g/L into 0.5 mol/L of acetic acid solution, and fully dissolving the collagen to obtain a solution B;

(3) isovolumetrically mixing the solution A with the solution B, stirring at room temperature, and adjusting the pH value to 5.0 to obtain a casting solution, wherein a mass ratio of the collagen to the tannic acid to the Laponite nanosheet is 10:1:0.2;

(4) pouring the casting solution into a square polytetrafluoroethylene mold with a side length of 10 cm, and naturally drying to obtain a nanocomposite film.

Embodiment 2

(1) adding montmorillonite nanosheet into deionized water for ultrasonic dispersion; then adding tannic acid into the mixture so that the concentration becomes 1 g/L; and adjusting the pH value to 3.5 to obtain a solution A, wherein a mass ratio of the tannic acid to the montmorillonite nanosheet is 1:0.4;

(2) adding collagen with a concentration of 10 g/L into 0.5 mol/L of acetic acid solution, and fully dissolving the collagen to obtain a solution B;

(3) isovolumetrically mixing the solution A with the solution B, stirring at room temperature, and adjusting the pH value to 5.0 to obtain a casting solution, wherein a mass ratio of the collagen to the tannic acid to the montmorillonite nanosheet is 10:1:0.4;

(4) pouring the casting solution into a square polytetrafluoroethylene mold with a side length of 10 cm, and naturally drying to obtain a nanocomposite film.

Embodiment 3

(1) adding kaolin nanosheet into deionized water for ultrasonic dispersion, then adding tannic acid into the mixture so that the concentration becomes 1 g/L, and adjusting the pH value to 3.5 to obtain a solution A, wherein a mass ratio of the tannic acid to the kaolin nanosheet is 1:0.6;

(2) adding collagen with a concentration of 10 g/L into 0.5 mol/L of acetic acid solution, and fully dissolving the collagen to obtain a solution B;

(3) isovolumetrically mixing the solution A with the solution B, stirring at room temperature, and adjusting the pH value to 5.0 to obtain a casting solution, wherein a mass ratio of the collagen to the tannic acid to the kaolin nanosheet is 10:1:0.6;

(4) pouring the casting solution into a square polytetrafluoroethylene mold with a side length of 10 cm, and drying naturally to obtain a nanocomposite film.

Embodiment 4

(1) adding Laponite nanosheet into deionized water for ultrasonic dispersion, then adding folic acid into the mixture so that the concentration becomes 1 g/L, and adjusting the pH value to 3.5 to obtain a solution A, wherein a mass ratio of the folic acid to the laponite nanosheet is 1:0.8;

(2) adding collagen with a concentration of 10 g/L into 0.5 mol/L of acetic acid solution, and fully dissolving the collagen to obtain a solution B;

(3) isovolumetrically mixing the solution A with the solution B, stirring at room temperature, and adjusting the pH value to 5.0 to obtain a casting solution, wherein a mass ratio of the collagen to the folic acid to the Laponite nanosheet is 10:1:0.8;

(4) pouring the casting solution into a square polytetrafluoroethylene mold with a side length of 10 cm, and naturally drying to obtain a nanocomposite film.

EXPERIMENTAL EXAMPLE

Figure 2:
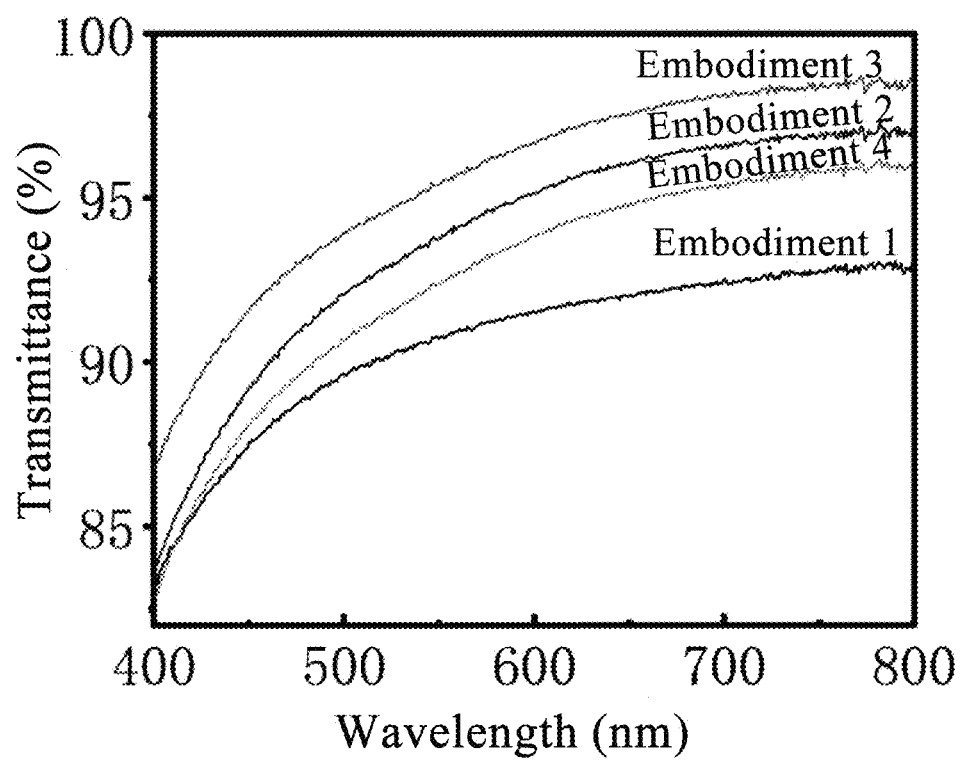
FIG. 2 is a diagram showing test results of the transmittance of the collagen-based composite film.
Figure 3:
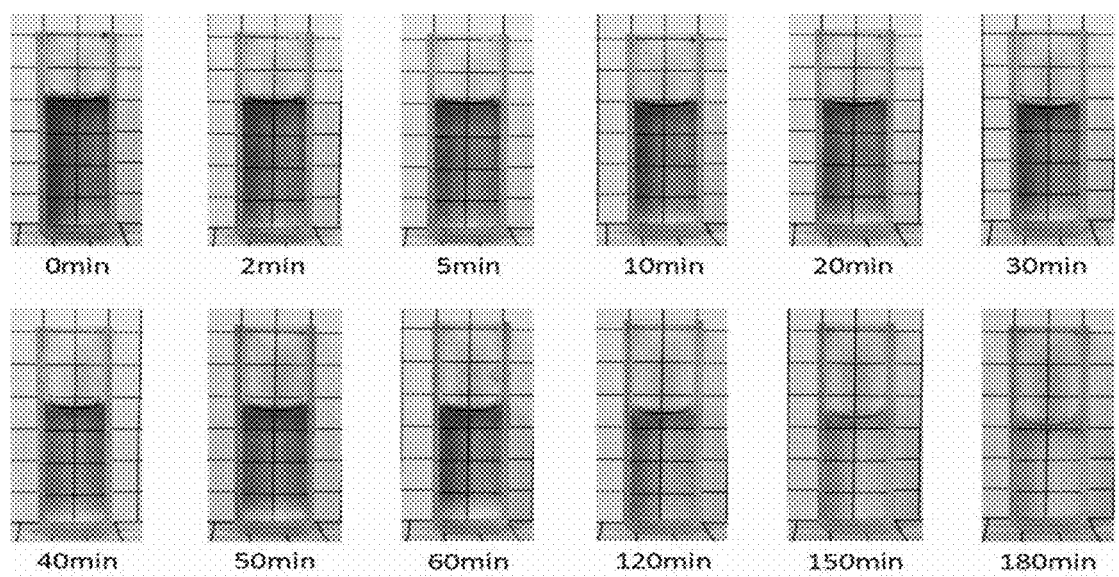
FIG. 3 is a diagram showing the results of the antioxidant property of a tannic acid-Laponite-collagen nanocomposite film.

FIG. 1 is a diagram of a collagen-based composite film, wherein a control sample is a pure collagen film; FIG. 2 is a diagram showing test results of the transmittance of the collagen-based composite film; FIG. 3 is a diagram showing the results of the antioxidant property of a tannic acid-Laponite-collagen nanocomposite film. These figures show that the composite film prepared by the method of the present invention is biodegradable, and has high transmittance and significant antioxidant property.

The above embodiments only exemplify principles and effects of the present invention. Those ordinary skilled in the art can make several modifications and improvements without departing from creative ideas of the present invention; and the modifications and improvements also fall within the protection scope of the present invention.

We claim:

1. A preparation method of a green, biodegradable, and multifunctional collagen-based nanocomposite film, comprising the following steps:

(1) adding silicate nanosheet into deionized water for ultrasonic dispersion to form a mixture, then adding polyphenolic acid into the mixture, wherein a mass ratio of the polyphenolic acid to the silicate nanosheet is 1:(0.2-1), and adjusting pH to 3.0-4.0 to obtain a solution A;

(2) adding collagen with a concentration of 5 g/L into an acetic acid solution, and fully dissolving the collagen to obtain a solution B;

(3) isovolumetrically mixing the solution A with the solution B, stirring at room temperature, and adjusting pH value to 4.5-5.5 to obtain a casting solution;

(4) pouring the casting solution into a polytetrafluoroethylene mold, and naturally drying to obtain a nanocomposite film;

the silicate nanosheet is any one of Laponite, montmorillonite, and kaolin; and the polyphenolic acid is any one of tannic acid, folic acid, and gallic acid.

\* \* \* \* \*